United States Patent [19]

Dittbenner

[11] Patent Number: 5,912,914

[45] Date of Patent: Jun. 15, 1999

[54] INSULATED LASER TUBE STRUCTURE AND METHOD OF MAKING SAME

[76] Inventor: Gerald R. Dittbenner, 4353 Findlay Way, Livermore, Calif. 94550

[21] Appl. No.: 09/060,338

[22] Filed: Apr. 14, 1998

Related U.S. Application Data

[63] Continuation of application No. 08/041,102, Apr. 5, 1993, abandoned.

[51] Int. Cl.$^6$ .................................. H01S 3/04; H01S 3/22
[52] U.S. Cl. ............................... 372/56; 372/34; 359/337
[58] Field of Search .............................. 359/337; 372/33, 372/34, 56

[56] References Cited

U.S. PATENT DOCUMENTS

| | | |
|---|---|---|
| 4,905,248 | 2/1990 | Nishida . |
| 4,953,172 | 8/1990 | Gurski . |
| 4,991,180 | 2/1991 | Yamaguchi et al. . |
| 5,345,458 | 9/1994 | Alger . |
| 5,359,614 | 10/1994 | Milner . |

OTHER PUBLICATIONS

Eugene A. Avallone, et al.; "*Marks' Standard Handbook for Mechanical Engineers,*" (9$^{th}$ Ed.), McGraw–Hill Book Company, ISBN 0–07–004127–X, pp. 6–103.

Milton Ohring; "*Engineering Materials Science,*" *Academic Press*, (1995), ISBN 0–12–524995–0, p. 287.

*Primary Examiner*—Nelson Moskowitz
*Attorney, Agent, or Firm*—David G. Beck; Townsend and Townsend and Crew

[57] ABSTRACT

An insulated high temperature ceramic laser tube having substantially uniform insulation along the length of the tube is disclosed having particulate ceramic insulation positioned between the outer wall of the ceramic laser tube and the inner surface of tubular ceramic fiber insulation which surrounds the ceramic laser tube. The particulate ceramic insulation is preferably a ceramic capable of sintering to the outer surface of the ceramic laser tube and to the inner surface of the tubular ceramic fiber insulation. The addition of the particulate ceramic insulation to fill all the voids between the ceramic laser tube and the fibrous ceramic insulation permits the laser tube to be operated at a substantially uniform temperature throughout the length of the laser tube.

14 Claims, 3 Drawing Sheets

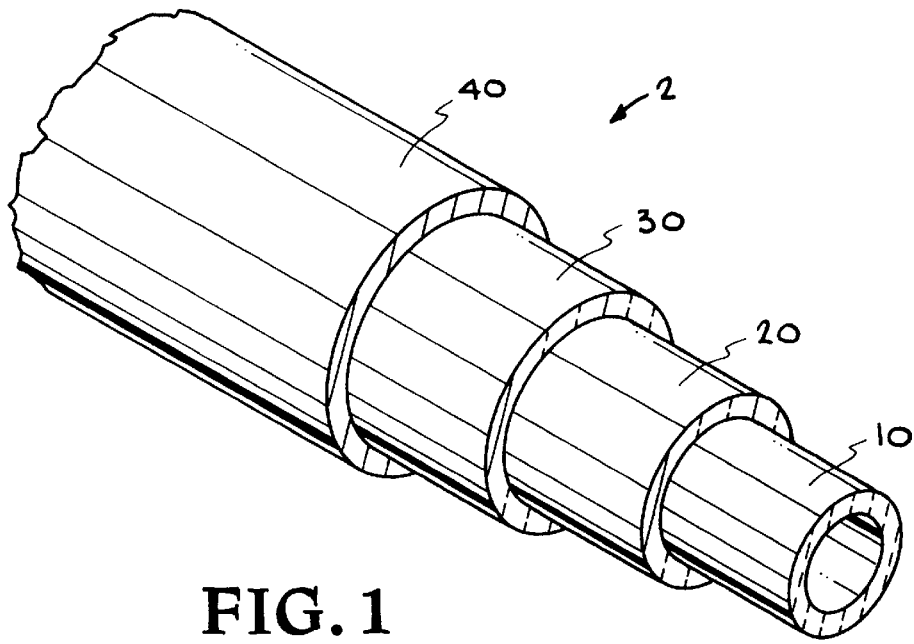

FIG. 1

```
SURROUNDING THE WALL OF A CERAMIC
LASER TUBE WITH A FIBROUS TUBULAR
CERAMIC INSULATION MATERIAL
```

```
FILLING THE SPACE BETWEEN THE
OUTER WALL OF THE CERAMIC
LASER TUBE AND THE INSIDE
SURFACE OF THE FIBROUS TUBULAR
CERAMIC INSULATION WITH A
SINTERABLE CERAMIC PARTICULATE
```

```
THEN HEATING THE RESULTING
STRUCTURE SUFFICIENTLY TO
SINTER THE CERAMIC PARTICULATE
TO BOND IT TO EITHER THE
CERAMIC LASER TUBE, THE FIBROUS
CERAMIC INSULATION, OR BOTH
```

FIG. 6

INSULATED LASER TUBE STRUCTURE AND METHOD OF MAKING SAME

The present application is a continuation of U.S. patent application Ser. No. 08/041,102, filed Apr. 5, 1993, and now abandoned, which is incorporated in full herein for any and all purposes.

BACKGROUND OF THE INVENTION

The invention described herein arose in the course of, or under, Contract No. W-7405-ENG-48 between the United States Department of Energy and the University of California for the operation of Lawrence Livermore National Laboratory.

This invention relates to an insulated tube for a laser and a method of making same. More particularly, this invention relates to an insulated laser tube with a particular insulation structure and a method of making this particular insulation structure.

In the operation of a laser, and more particularly in the transport of the laser beam from the source to the target, it is critical to the performance of the laser that the evacuated enclosure, such as a tube, through which the laser passes be maintained at a constant temperature. Furthermore, when very high temperatures are used, i.e., temperatures of over 1000° C., and in some instance in excess of 1500° C., the use of ceramic materials is dictated by the temperature. It is important to the life of the ceramic tube that temperature gradients along the length of the tube, and resultant stresses, be avoided, i.e., that the temperature be uniform along the entire length of the tube. This, in turn, requires a highly insulated structure.

Prior art approaches to this problem have included the use of prefabricated tubular bats of fibrous insulation which are placed around the laser tube to be insulated. In some instances, an outer shell, e.g., a quartz tube is then placed around the fibrous insulation, not only to secure it in place, but also to provide mechanical or structural protection to the insulation.

However, it has been found that such prefabricated tubular insulation, when assembled around the ceramic laser tube at room temperature, prior to heating the laser tube to operating temperature, results in a structure wherein voids are present between the outer wall of the ceramic laser tube and the inner surface of the prefabricated tubular fibrous insulation. Such voids, being non-homogeneous in size and position, result in varying degrees of insulation value at various positions along the ceramic laser tube resulting, in turn, in temperature variations along the laser tube. Ideal laser performance will be achieved if the temperature gradients throughout the laser are less than about 25° C. Large temperature variations degrade the performance of the laser, and also are sufficient to eventually cause damage to the ceramic laser tube due to the resultant thermal stresses set up in the ceramic tube by such thermal gradients, particularly at operating temperatures in excess of 1500° C.

It would, therefore, be desirable to provide an insulated ceramic laser tube having a more uniform high temperature insulation surrounding the walls of the tube and a method of forming such uniform insulation.

SUMMARY OF THE INVENTION

It is, therefore, an object of the invention to provide an insulated high temperature ceramic laser enclosure having substantially uniform insulation along the length of the enclosure.

It is another object of the invention to provide an insulated high temperature ceramic laser enclosure having additional ceramic insulation positioned between the outer wall of the ceramic laser enclosure and the inner surface of tubular ceramic fiber insulation which surrounds the ceramic laser enclosure.

It is yet another object of the invention to provide an insulated high temperature ceramic laser tube having particulate ceramic insulation packed between the outer wall of the ceramic laser tube and the inner surface of tubular ceramic fiber insulation which surrounds the ceramic laser tube.

It is a further object of the invention to provide an insulated high temperature ceramic laser tube having packed between the outer wall of the ceramic laser tube and the inner surface of tubular ceramic fiber insulation which surrounds the ceramic laser tube, particulate ceramic insulation capable of sintering to the outer surface of the ceramic laser tube and to the inner surface of the tubular ceramic fiber insulation.

It is yet a further object of the invention to provide a method for forming an insulated high temperature ceramic laser tube having sinterable particulate ceramic insulation packed between the outer wall of the ceramic laser tube and the inner surface of tubular ceramic fiber insulation which surrounds the ceramic laser tube.

These and other objects of the invention will be apparent from the following description and accompanying drawings.

BRIEF DESCRIPTION OF THE DRAWINGS

FIG. 1 is a partially cutaway isometric view of the insulated laser enclosure of the invention, in the form of a tube, showing the various layers surrounding one another.

FIG. 6 is a flowsheet illustrating the process of the invention.

DETAILED DESCRIPTION OF THE INVENTION

Figure 2:
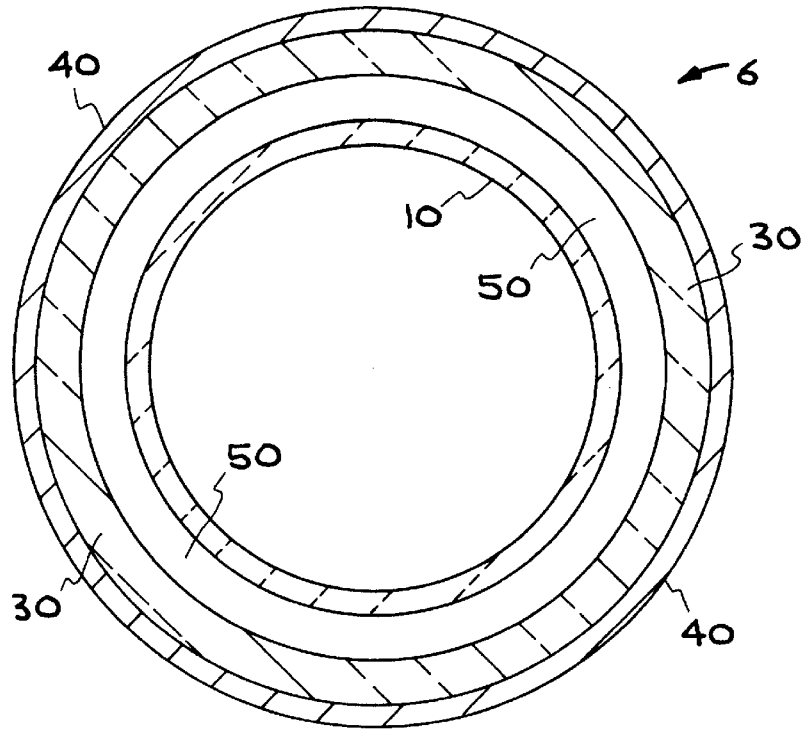
FIG. 2 is a cross-sectional end view of a prior art structure comprising a ceramic laser tube surrounded by fibrous tubular ceramic insulation prior to the addition of the particulate ceramic insulation into irregular voids shown, in exaggerated form, between the outer wall of the ceramic laser tube and the inner surface of the fibrous tubular insulation.

Referring now to FIG. 1, the insulated ceramic laser enclosure of the invention is generally depicted at 2 in the illustrated embodiment, by way of illustration and not of limitation, as a central cylindrical ceramic laser tube 10 through which the laser beam travels from source to target, a layer of sintered particulate insulation 20 surrounding ceramic laser tube 10, a layer of fibrous ceramic insulation 30 surrounding particulate ceramic layer 20, and an optional outer shell 40. The insulated ceramic laser tube of the invention, is capable of being maintained at a substantially uniform temperature throughout its entire length. By "substantially uniform" is meant a temperature which does not vary by more than 25° C. throughout the entire length of the laser tube.

Figure 3:
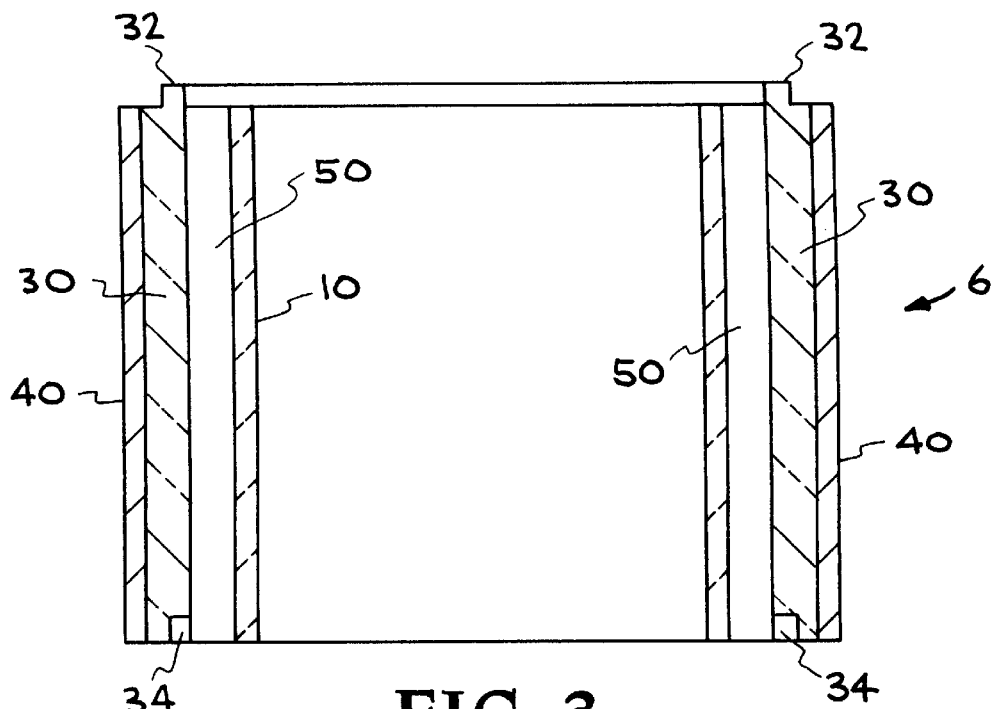
FIG. 3 is a cross-sectional side view of the prior art structure of FIG. 2 showing, in exaggerated form, the irregular voids lying between the ceramic laser tube and the surrounding fibrous tubular ceramic insulation prior to the addition of the particulate ceramic insulation, in accordance with the invention, to fill the voids.

As shown in FIGS. 2 and 3, a prior art insulated ceramic laser tube generally depicted at 6, comprises a central cylindrical ceramic laser tube 10 through which the laser beam travels from source to target, a layer of fibrous ceramic insulation 30 surrounding ceramic laser tube 10, and an optional outer shell 40, with voids 50, depicted in exaggerated scale for illustrative purposes, located between ceramic laser tube 10 and fibrous ceramic insulation 30.

Figure 4:
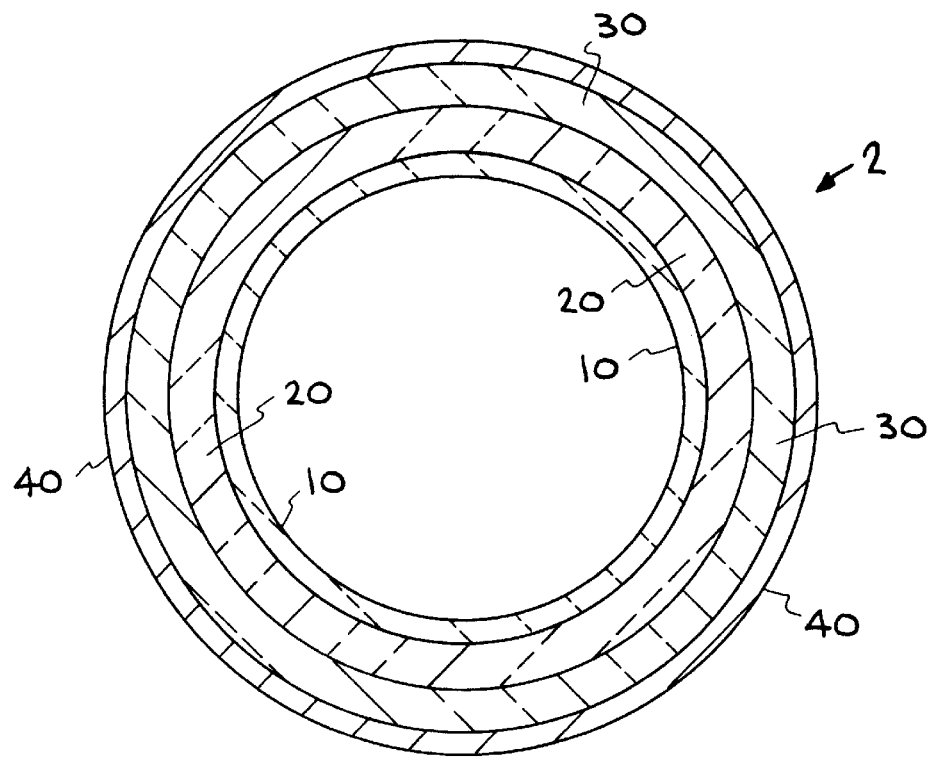
FIG. 4 is a cross-sectional end view of a ceramic laser tube surrounded by fibrous tubular insulation after addition of the particulate ceramic insulation to fill the voids between the outer wall of the ceramic laser tube and the inner surface of the fibrous tubular insulation.
Figure 5:
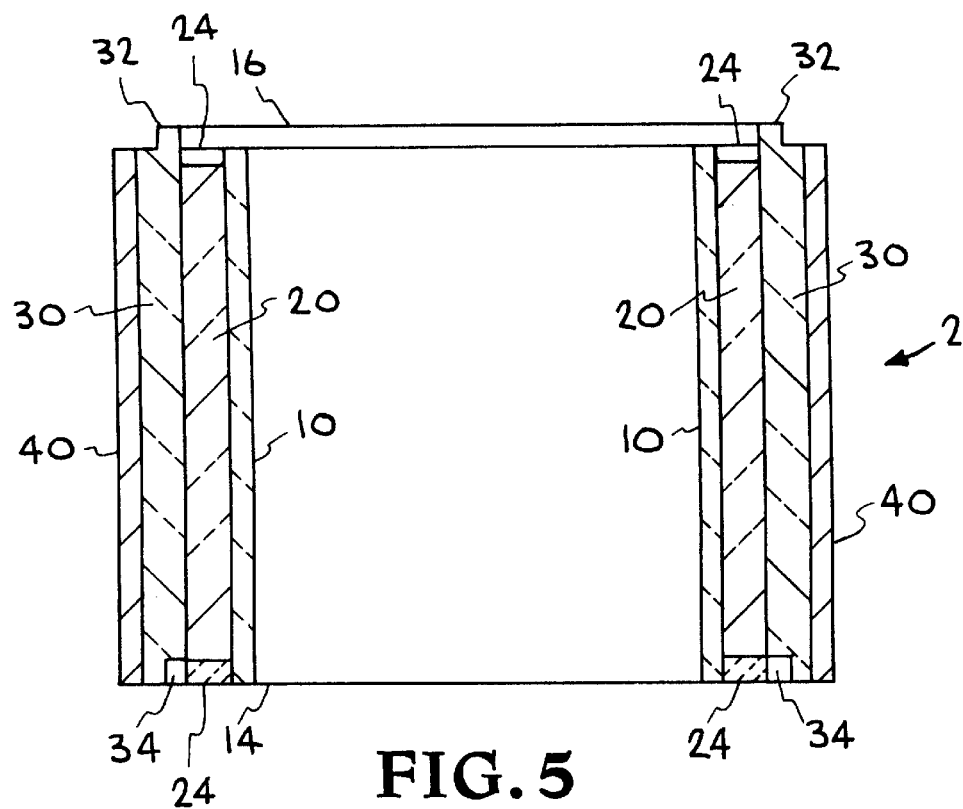
FIG. 5 is a cross-sectional side view of the structure of FIG. 4, showing the particulate ceramic insulation filling the voids lying between the ceramic laser tube and the surrounding fibrous tubular insulation.

FIGS. 4 and 5 show, at 2, the insulated ceramic tube of the invention which, while comprising the same central cylindrical ceramic laser tube 10 shown in FIGS. 2 and 3, with fibrous ceramic insulation 30 surrounding ceramic laser tube 10 and optional outer shell 40 surrounding insulation 30, also contains particulate ceramic insulation 20 filling voids 50 of FIGS. 2 and 3 in accordance with the invention.

It should be noted that the thickness of insulation 30 may be varied along the length of laser tube 10, if it is desired to provide a temperature gradient in laser tube 10. When this happens, a variation in the gap thickness or void 50 between laser tube 10 and insulation 30 may result. In such cases, the amount of ceramic particulate to be used will be changed to still fill the entire void 50. It will, of course, be further understood that the ceramic particulate itself also provides insulation between laser tube 10 and outer shell 40.

Ceramic laser tube 10 may comprise any gas-tight ceramic material such as, for example, alumina, berylia, magnesia, silica, titania, zirconia, provided however that the particular ceramic is capable of withstanding the operating temperature of the laser and is non-reactive with any gases used in forming and maintaining the laser. In a preferred embodiment, ceramic laser tube 10 comprises a high purity alumina material which is capable of withstanding operating temperatures as high as 1550° C., the operating temperature of a copper vapor laser. By "high purity" is meant an alumina having a purity in excess of 99.99 wt. % aluminum oxide.

Fibrous ceramic insulation 30 may comprise any low density fibrous ceramic material such as any of the above mentioned ceramic materials. By "low density" is meant a density lower than about 0.24 grams/cm$^3$ (gm/cc). In a preferred embodiment, when ceramic laser tube 10 is constructed of alumina, fibrous ceramic insulation 30 comprises a fibrous alumina material. Such a low density alumina fibrous ceramic insulation is commercially available from Zircar Products, Inc. under the trademark Zircar. As shown in FIG. 3, one end of each fibrous ceramic insulation tube 30 may be provided with a reduced outer diameter, as shown at 32, to fit into a corresponding socket 34 at the opposite end of the adjacent tube 30.

Particulate ceramic material 20 may comprise any ceramic material such as, for example, the aforementioned alumina, berylia, magnesia, silica, titania, and zirconia ceramics. Preferably, particulate ceramic material 20, laser tube 10, and fibrous ceramic insulation material 30 will all comprise the same material to facilitate sintering of the materials together, as will be discussed below, as well as to prevent or inhibit thermal stresses which might develop at the high operating temperatures if different ceramics were used.

The average particle size of particulate ceramic filler material 20 may vary from about 40 microns to about 100 microns. Preferably, however, the average particle size will vary from about 40 to 60 microns, and most preferably, the average particle size of ceramic particulate 20 will be about 50 microns, with not more than about 20 wt. % of the particles varying from this average particle size by more than about 10%.

In accordance with the invention, sections of fibrous ceramic insulation 30 are first assembled around ceramic laser tube 10 to completely surround tube 10 from one end to the other. Then, a sealing material 24, such as Nextel ceramic fiber tape/sleeving available from the Ceramic Fiber Division of 3M, is placed at one end 14 of the laser tube 10/fibrous ceramic insulation 30 composite, and the structure is placed on end on a shaker vibrator table, with sealed end 14 on the table. Particulate ceramic insulation material 20 is then poured into open spaces or voids 50 between inner laser tube 10 and surrounding fibrous tube of insulation 30 while the entire structure 2 is vibrated to cause particulate ceramic insulation 20 to completely fill all void spaces 50 between ceramic laser tube 10 and the fibrous tube of ceramic insulation 30. After void spaces 50 have been completely filled, top end 16 of the tube 10/fibrous ceramic insulation 30 composite is also sealed in the same manner that lower end 14 was sealed.

The particulate insulation material 20, which fills the previous voids 50 shown in FIGS. 2 and 3 between laser tube 10 and fibrous ceramic insulation 30, may now be sintered, either in a separate operation, or in situ during operation of the laser tube to thereby bond the particulate insulation to both laser tube 10 and fibrous ceramic insulation 30. This sintered bonding of the ceramic particulate filler to both ceramic laser tube 10 and fibrous ceramic insulation 30 ensures that the previous voids will remain filled, i.e., packed particulate ceramic filler material 20 will not settle or shift thereby resulting in the recreation of voids 50.

Particulate ceramic filler material 20 may be sintered to both laser tube 10 and fibrous ceramic insulation 30 by heating the composite to the particular sintering temperature of ceramic particulate 20, e.g., a temperature of about 1550° C. for alumina, and then maintaining the structure at this temperature for a period of at least about 50 hours. Longer sintering time periods may be used, but are unnecessary and therefore, uneconomical.

It should be noted at this point that if ceramic laser tube 10, ceramic particulate 20, and fibrous ceramic insulation bats 30 are not all constructed of the same ceramic material, the sintering temperature of ceramic particulate 20 must be lower than the softening point of laser tube 10 and fibrous ceramic insulation bats 30. That is, one will not want to risk damage to the laser tube or adjacent insulation when sintering ceramic particulate 20.

Alternatively, if the operating temperature of the laser tube is at least as high as the sintering temperature of ceramic particulate 20, particulate 20 may be sintered in situ during operation of the laser.

To further illustrate the invention, a 4 foot long high purity alumina laser tube, used in a copper vapor laser, having an O.D. of 2 inches was surrounded with a series of interlocking fibrous tubular Zircar alumina ceramic insulation bats having an I.D. of 2 inches and an O.D. of 3.5 inches procured from Zircar Products, Inc. One of the tubes was 18 inches long and two other tubes were each 15 inches in length.

The space between the laser tube and the fibrous tubular alumina ceramic insulation bats at one end of the composite was sealed using Nextel ceramic fiber tape and the composite was then placed on a shaker table with this sealed end down. High purity alumina powder, having an average particle size of about 50 microns, was poured into the space between the outer wall of the laser tube and the inner surface of the tubular ceramic insulation while the composite was vibrated to settle the alumina particulate. After the space had been completely filled the top of the composite was sealed, similar to the bottom. The insulated laser tube was then assembled into a laser structure, evacuated, and then operated at a temperature of about 1550° C. for a period of approximately 15,000–20,000 hours. During this time the temperature of the laser tube was monitored at 6 inch intervals along the entire length of the laser tube. The maximum measured temperature difference from the average temperature of 1550° C. was not more than 25° C.

The insulated laser tube was then disassembled from the laser apparatus and the tube was cut open to examine a cross-section of the tube and insulation. The particulate alumina was found to have sintered together and bonded to both the ceramic laser tube and to the surrounding tubular ceramic insulation. The experiment was repeated over 100 times using various 4 foot and 9 foot long laser tubes. In each case the tube life was found to be over 15,000 hours.

Thus, the invention provides an improved insulated laser tube capable of being operated at a substantially uniform temperature along the entire length of the tube, wherein particulate ceramic insulation is used to eliminate voids formed between the ceramic laser tube and conventional fibrous ceramic insulation.

While a specific embodiment of the insulated laser tube of the invention has been illustrated and the process described for carrying out the formation of the insulated laser tube in accordance with this invention, modifications and changes of the apparatus, parameters, materials, etc. will become apparent to those skilled in the art, and it is intended to cover in the appended claims all such modifications and changes which come within the scope of the invention.

What is claimed is:

1. An insulated ceramic laser enclosure for maintaining a substantially uniform temperature from a first end of said laser enclosure to a second end of said laser enclosure, said laser enclosure comprising:

an inner ceramic laser tube;

an outer fibrous ceramic insulation surrounding said inner ceramic laser tube, said outer fibrous ceramic insulation approximately concentric with said inner ceramic laser tube, wherein a plurality of voids are located between said inner ceramic laser tube and said outer fibrous ceramic insulation; and a vibrationally compressed ceramic particulate insulation located between said inner ceramic laser tube and said outer fibrous ceramic insulation and within said plurality of voids, wherein said vibrationally compressed ceramic particulate insulation is sintered.

2. A method of fabricating an insulated ceramic laser enclosure, said insulated ceramic laser enclosure maintaining a substantially uniform temperature from a first end of said laser enclosure to a second end of said laser enclosure, the method comprising the steps of:

surrounding an inner ceramic laser tube with an outer fibrous ceramic insulation, wherein a plurality of voids are located between said inner ceramic laser tube and said outer fibrous ceramic insulation;

sealing a first end of said inner ceramic laser tube to a first end of said outer fibrous ceramic insulation;

filling an area comprised of said plurality of voids between said inner ceramic laser tube and said outer fibrous ceramic insulation with ceramic particulate insulation;

vibrating said inner ceramic laser tube and said outer fibrous ceramic insulation during said filling step, wherein said vibrating step causes compression of said ceramic particulate insulation;

sealing a second end of said inner ceramic laser tube a second end of said outer fibrous ceramic insulation; and sintering said vibrationally compressed ceramic particulate insulation.

3. The method of claim 2, wherein said sintering step causes a portion of said vibrationally compressed ceramic particulate insulation to be sintered to a portion of an outer surface of said inner ceramic laser tube, and wherein said sintering step causes a portion of said vibrationally compressed ceramic particulate insulation to be sintered to a portion of an inner surface of said outer fibrous ceramic insulation.

4. The method of claim 2, wherein said inner ceramic laser tube, said outer fibrous ceramic insulation, and said ceramic particulate insulation are all comprised of high purity alumina.

5. The method of claim 2, wherein said sintering step occurs at a temperature of about 1550° C.

6. The insulated ceramic laser enclosure of claim 1 wherein said sintered vibrationally compressed ceramic particulate insulation is sintered to said inner ceramic laser tube and to said outer fibrous ceramic insulation.

7. The insulated ceramic laser enclosure of claim 6 wherein said inner ceramic laser tube, said outer fibrous ceramic insulation, and said sintered vibrationally compressed ceramic particulate insulation all comprise the same ceramic material.

8. The insulated ceramic laser enclosure of claim 7 wherein said inner ceramic laser tube, said outer fibrous ceramic insulation, and said sintered vibrationally compressed particulate insulation all comprise high purity alumina ceramic material.

9. The insulated ceramic laser enclosure of claim 1 wherein said vibrationally compressed ceramic particulate insulation has an average particle size, prior to said sintering, of from about 40 microns to about 100 microns.

10. The insulated ceramic laser enclosure of claim 1 wherein said vibrationally compressed ceramic particulate insulation has an average particle size, prior to said sintering, of from about 40 microns to about 60 microns.

11. The insulated ceramic laser enclosure of claim 1 wherein said vibrationally compressed ceramic particulate insulation has an average particle size, prior to said sintering, of from about 50 microns.

12. The insulated ceramic laser enclosure of claim 1 wherein said insulated ceramic laser enclosure is cylindrical in shape.

13. The method of claim 2 which further includes the step of selecting the same ceramic material for said inner ceramic laser tube, said ceramic particulate insulation, and said outer fibrous ceramic insulation.

14. The method of claim 2 wherein said ceramic particulate insulation has an average particle size ranging from about 20 microns to about 60 microns.

* * * * *